US012669062B2

(12) United States Patent
Takei

(10) Patent No.: US 12,669,062 B2
(45) Date of Patent: Jun. 30, 2026

(54) TURBINE

(71) Applicant: MITSUBISHI HEAVY INDUSTRIES AERO ENGINES, LTD., Komaki (JP)

(72) Inventor: Sotaro Takei, Tokyo (JP)

(73) Assignee: MITSUBISHI HEAVY INDUSTRIES AERO ENGINES, LTD., Komaki (JP)

( * ) Notice: Subject to any disclaimer, the term of this patent is extended or adjusted under 35 U.S.C. 154(b) by 0 days.

(21) Appl. No.: 18/832,104

(22) PCT Filed: Aug. 17, 2022

(86) PCT No.: PCT/JP2022/031008
§ 371 (c)(1),
(2) Date: Jul. 23, 2024

(87) PCT Pub. No.: WO2023/157344
PCT Pub. Date: Aug. 24, 2023

(65) Prior Publication Data

US 2025/0109691 A1 Apr. 3, 2025

(30) Foreign Application Priority Data

Feb. 16, 2022 (JP) ................................ 2022-021744

(51) Int. Cl.
*F01D 5/18* (2006.01)
*F01D 25/12* (2006.01)

(52) U.S. Cl.
CPC ............... *F01D 5/18* (2013.01); *F01D 25/12* (2013.01); *F05D 2240/24* (2013.01); *F05D 2260/20* (2013.01)

(58) Field of Classification Search
CPC . F01D 5/18; F01D 5/181; F01D 25/12; F05D 2240/24; F05D 2260/20
See application file for complete search history.

(56) References Cited

U.S. PATENT DOCUMENTS 1,639,247 A 8/1927 Zoelly et al.
3,837,761 A * 9/1974 Brown ...................... F01D 5/22 416/191

(Continued)

FOREIGN PATENT DOCUMENTS

CN 201610771 U * 10/2010
JP S59229001 A 12/1984

(Continued)

OTHER PUBLICATIONS

International Search Report and Written Opinion of International Application No. PCT/JP2022/031008 mailed on Oct. 25, 2022, 25 pp.

(Continued)

*Primary Examiner* — Nathaniel E Wiehe
*Assistant Examiner* — Theodore C Ribadeneyra
(74) *Attorney, Agent, or Firm* — HAUPTMAN HAM, LLP

(57) ABSTRACT

A turbine includes a rotor and a plurality of turbine blades along the rotor. The plurality of turbine blades includes first turbine blades including first moving blades and first shrouds provided to tip ends of the first moving blades, and second turbine blades including second moving blades adjacent to the first moving blades in a first direction of the rotor and second shrouds provided to tip ends of the second blades; in an overlapping region in which at least a portion of a first direction side surface on a first direction side of the first shroud and at least a portion of a second direction side surface on a second direction side of the second shroud overlap in the peripheral direction, the first direction side surface being further outside the second direction side surface; and the second shroud is heavier than the first shroud.

8 Claims, 7 Drawing Sheets

(56) References Cited

U.S. PATENT DOCUMENTS

| | | | |
|---|---|---|---|
| 5,511,948 A | 4/1996 | Suzuki et al. | |
| 10,738,640 B2 | 8/2020 | Kitagawa et al. | |
| 2003/0012655 A1 | 1/2003 | Sasaki et al. | |
| 2006/0002798 A1 | 1/2006 | Ooishi et al. | |
| 2009/0290983 A1 | 11/2009 | Tanaka | |
| 2015/0167469 A1 | 6/2015 | Deallenbach et al. | |
| 2017/0306768 A1 | 10/2017 | Szrajer et al. | |
| 2019/0128126 A1 | 5/2019 | Hofer et al. | |
| 2020/0032658 A1 | 1/2020 | Griffin et al. | |
| 2021/0010375 A1* | 1/2021 | Eshak | F01D 5/186 |

FOREIGN PATENT DOCUMENTS

| | | | |
|---|---|---|---|
| JP | H07145701 A | | 6/1995 |
| JP | H07229404 A | | 8/1995 |
| JP | 2001248404 A | | 9/2001 |
| JP | 2004052757 A | | 2/2004 |
| JP | 2004285931 A | | 10/2004 |
| JP | 2006009733 A | | 1/2006 |
| JP | 2009281365 A | | 12/2009 |
| JP | 2015129511 A | | 7/2015 |
| JP | 6066948 B2 | | 1/2017 |
| JP | 2017526846 A | | 9/2017 |
| JP | 2017198190 A | | 11/2017 |
| JP | 2018150857 A | * | 9/2018 |
| JP | 2020511611 A | | 4/2020 |
| JP | 2021521372 A | | 8/2021 |
| WO | 03104616 A1 | | 12/2003 |

OTHER PUBLICATIONS

Japan Patent Office, Notice of Reasons for Refusal for Japanese Patent Application No. 2022-021744 mailed on Aug. 12, 2025; 17 pp.

* cited by examiner

TURBINE

RELATED APPLICATIONS

The present application is a National Phase of International Application Number PCT/JP2022/031008 filed Aug. 17, 2022, and claims priority to Japanese Application Number 2022-021744 filed Feb. 16, 2022.

TECHNICAL FIELD

The present disclosure relates to a turbine.

The present application claims priority based on Japanese Patent Application No. 2022-021744 filed in Japan on Feb. 16, 2022, the contents of which are incorporated herein by reference.

BACKGROUND ART

In order to suppress vibration of blades during operation, turbines such as steam turbines and gas turbines have adopted several countermeasures. For example, PTL 1 discloses a configuration in which a shroud is provided in each of a plurality of blades, and the shrouds adjacent to each other are divided from each other and a pin engaging hole into which a pin is inserted to have a play is formed.

CITATION LIST

Patent Literature

[PTL 1] Japanese Unexamined Patent Application Publication No. 2004-285931

SUMMARY OF INVENTION

Technical Problem

However, a technique described in PTL 1 is to suppress the excitation of the blade by the pin being in sliding contact with the pin engaging hole, and a sliding contact portion of the pin is limited. Therefore, a damping effect of suppressing the vibration of the blade is small.

The present disclosure has been made in view of the above-described problems, and an object thereof is to provide a turbine capable of obtaining a high damping effect with respect to vibration of a blade.

Solution to Problem

In order to achieve the above object, a turbine according to the present disclosure includes a rotor; and a plurality of turbine blades disposed along a circumferential direction of the rotor, in which the plurality of turbine blades include a first turbine blade including a first rotor blade and a first shroud provided on a tip portion of the first rotor blade, and a second turbine blade including a second rotor blade disposed adjacent to the first rotor blade on one side in the circumferential direction of the rotor and a second shroud provided on a tip portion of the second rotor blade, in an overlap region in which at least a part of one side surface of the first shroud on the one side in the circumferential direction and at least a part of an other side surface of the second shroud on the other side in the circumferential direction overlap each other in the circumferential direction, the one side surface is located on an outer side in a radial direction with respect to the other side surface, and the second shroud is heavier than the first shroud.

Advantageous Effects of Invention

According to the turbine of the present disclosure, a high damping effect can be obtained with respect to the vibration of the blade.

DESCRIPTION OF EMBODIMENTS

Hereinafter, a turbine according to embodiments of the present disclosure will be described with reference to the drawings. The embodiments show aspects of the present disclosure and do not limit the present disclosure, and any change can be made within the scope of the technical idea of the present disclosure.

(Gas Turbine)

Figure 1:
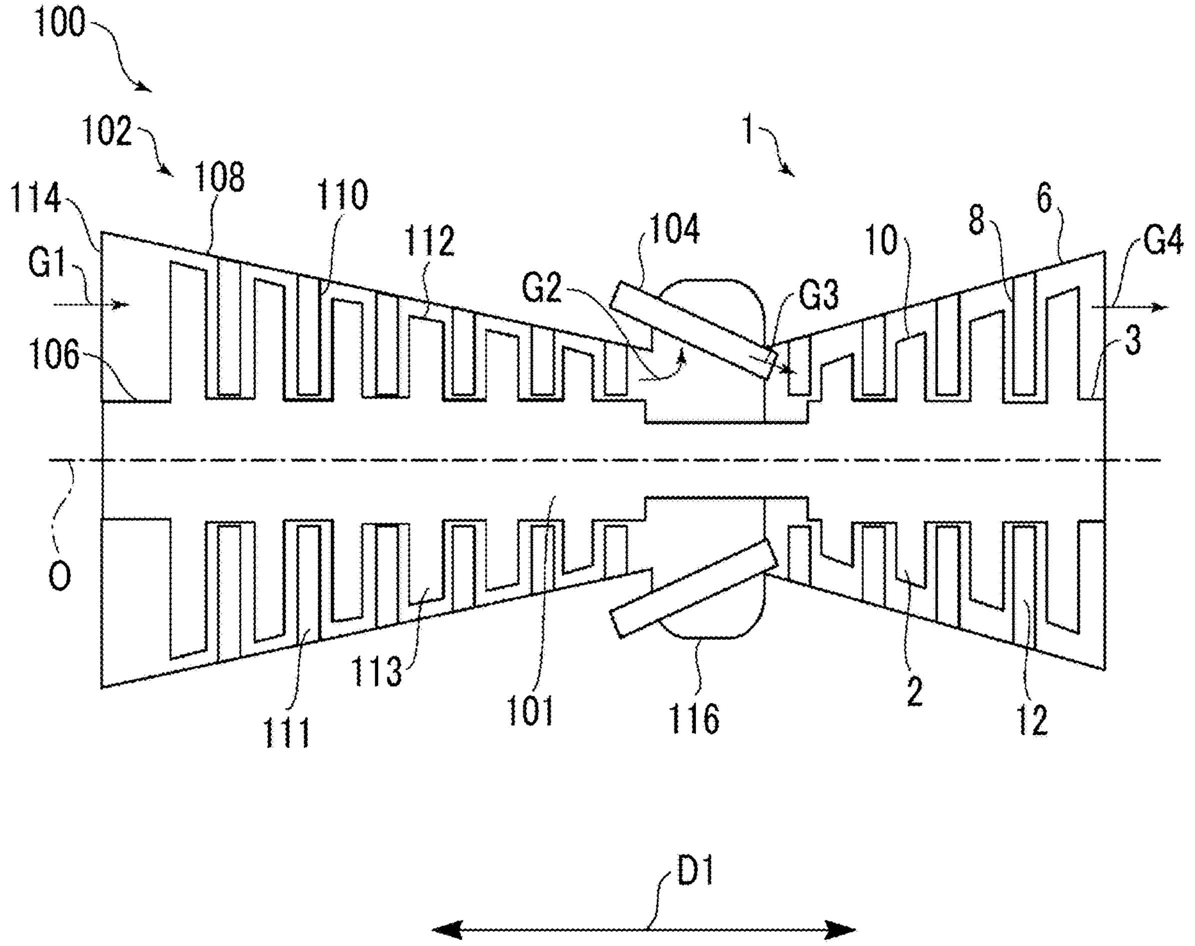
FIG. 1 is a diagram schematically showing a configuration example of a gas turbine including a turbine according to some embodiments.

FIG. 1 is a diagram schematically showing a configuration example of a gas turbine 100 including a turbine 1 according to some embodiments. As illustrated in FIG. 1, the gas turbine 100 includes a compressor 102 for generating compressed air G2, a combustor 104 for generating a combustion gas G3 by using the compressed air G2 and a fuel, and a turbine 1 configured to be rotationally driven by the combustion gas G3. The gas turbine 100 is applied, for example, as an aircraft engine for obtaining a propulsion force of an aircraft. The gas turbine 100 may be used for another purpose such as power generation.

The compressor 102 includes a compressor rotor 106, a compressor casing 108, a plurality of compressor stator blade rows 110, and a plurality of compressor rotor blade rows 112.

The compressor rotor 106 is configured to rotate around an axis O. The compressor rotor 106 has a rod shape and has a longitudinal direction along an axial direction D1 in which the axis O extends. The compressor casing 108 has a cylindrical shape and covers the compressor rotor 106 from outside in a radial direction of the compressor rotor 106.

The plurality of compressor stator blade rows 110 are fixed to the compressor casing 108 at intervals from each other along the axial direction D1. Each of the plurality of compressor stator blade rows 110 includes a plurality of compressor stator blades 111 disposed at intervals from each other along a circumferential direction of the compressor rotor 106 on an inner peripheral surface of the compressor casing 108.

The plurality of compressor rotor blade rows 112 are embedded in the compressor rotor 106 at intervals from each other along the axial direction D1 so as to be alternately arranged with respect to the compressor stator blade rows 110. Each of the plurality of compressor rotor blade rows 112 includes a plurality of compressor rotor blades 113 disposed at intervals each from other along the circumferential direction of the compressor rotor 106 on an outer peripheral surface of the compressor rotor 106.

In the compressor 102 illustrated in FIG. 1, an air intake port 114 for taking in air G1 from the outside is formed. The air G1 taken into the compressor 102 is compressed by passing through the plurality of compressor stator blade rows 110 and the plurality of compressor rotor blade rows 112, and becomes high-temperature and high-pressure compressed air G2.

The combustor 104 is supplied with a fuel and the compressed air G2 generated by the compressor 102, and generates a combustion gas G3, which is a working fluid of the turbine 1, by mixing and combusting the fuel and the compressed air G2. In the embodiment illustrated in FIG. 1, the gas turbine 100 includes a combustor casing 116 disposed between the compressor casing 108 and a turbine casing 6 (described later) in the axial direction D1. A plurality of the combustors 104 are disposed in the combustor casing 116.

The turbine 1 includes a turbine rotor 3, the turbine casing 6, a plurality of turbine stator blade rows 8, and a plurality of turbine rotor blade rows 10.

The turbine rotor 3 is configured to be rotatable around the axis O. The turbine rotor 3 has a rod shape and has a longitudinal direction along the axial direction D1. In the embodiment illustrated in FIG. 1, the turbine rotor 3 and the compressor rotor 106 are integrally connected to each other in the axial direction D1. In other words, the gas turbine 100 includes a gas turbine rotor 101 that is configured to include the turbine rotor 3 and the compressor rotor 106.

Hereinafter, a radial direction of the turbine rotor 3 will be simply referred to as a "radial direction D2", and a circumferential direction of the turbine rotor 3 will be simply referred to as a "circumferential direction D3". The radial direction D2 is orthogonal to the axis O. In the radial direction D2, a direction approaching the axis O is defined as a direction toward an inner side in the radial direction D2, and a direction away from the axis O is defined as a direction toward an outer side in the radial direction D2.

The turbine casing 6 has a cylindrical shape and covers the turbine rotor 3 from outside in the radial direction D2.

The plurality of turbine stator blade rows 8 are fixed to the turbine casing 6 at intervals from each other along the axial direction D1. Each of the plurality of turbine stator blade rows 8 includes a plurality of turbine stator blades 12 disposed at intervals from each other along the circumferential direction D3 on an inner peripheral surface of the turbine casing 6.

The plurality of turbine rotor blade rows 10 are embedded in the turbine rotor 3 at intervals from each other along the axial direction D1 so as to be alternately arranged with respect to the turbine stator blade rows 8. Each of the plurality of turbine rotor blade rows 10 includes a plurality of turbine rotor blades 2 disposed along the circumferential direction D3 on an outer peripheral surface of the turbine rotor 3.

The turbine 1 illustrated in FIG. 1 is supplied with the combustion gas G3 generated by the combustor 104, and the turbine rotor 3 is rotationally driven by the combustion gas G3 passing through the plurality of turbine stator blade rows 8 and the plurality of turbine rotor blade rows 10. The compressor 102 compresses the air G1 flowing inside the compressor 102 by transmitting a rotational force of the turbine 1 through the turbine rotor 3. The turbine 1 exhausts the combustion gas G3 (exhaust gas G4) that has passed through the plurality of turbine stator blade rows 8 and the plurality of turbine rotor blade rows 10 as a propulsion force of an aircraft.

Although not shown, in some embodiments, the gas turbine 100 further includes a fan disposed on a side opposite to the turbine 1 with the compressor 102 interposed therebetween in the axial direction D1 in order to increase an amount of the air G1 taken into the compressor 102. The fan is connected to the turbine rotor 3 via the compressor rotor 106 and is rotationally driven by a rotational force of the turbine 1.

Hereinafter, a specific configuration of the turbine 1 according to the present disclosure will be described.

First Embodiment (Configuration)

Figure 2:
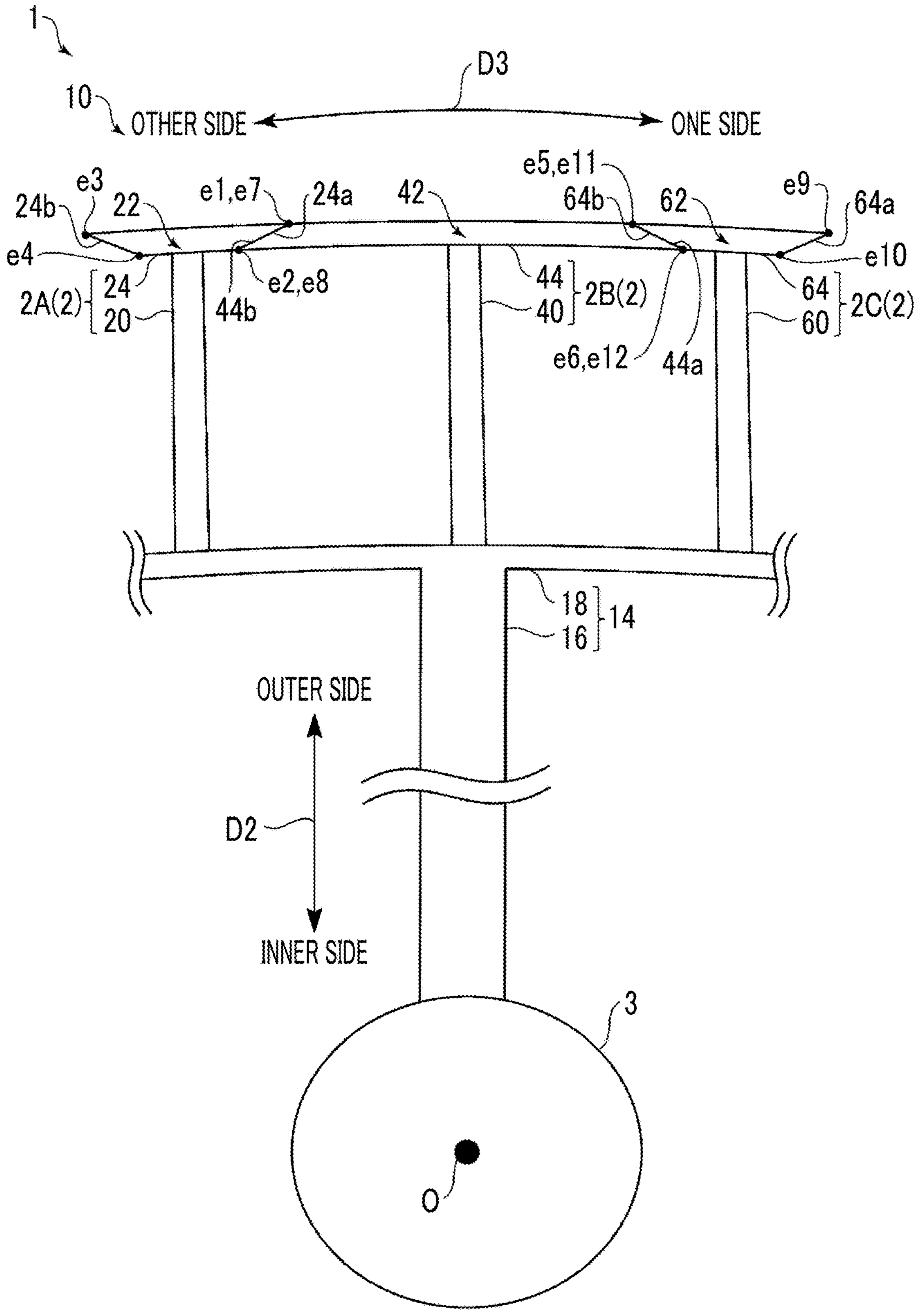
FIG. 2 is a diagram schematically showing a configuration of a turbine according to a first embodiment.

FIG. 2 is a diagram schematically showing a configuration of the turbine 1 according to the first embodiment. FIG. 2 is a schematic view of a part of the turbine rotor blade row 10 of FIG. 1 as viewed in the axial direction D1.

In the first embodiment, as illustrated in FIG. 2, the turbine 1 includes a rotor disc 14 fixed to the turbine rotor 3. The rotor disc 14 is fixed to the turbine rotor 3, for example, by being fitted into a hole formed in the outer peripheral surface of the turbine rotor 3. In some embodiments, the rotor disc 14 is fixed to the turbine rotor 3 by a fastener such as a bolt.

In the first embodiment, as illustrated in FIG. 2, the rotor disc 14 includes a radially extending portion 16 connected to the turbine rotor 3 and extending from the turbine rotor 3 to the outer side in the radial direction D2, and a circumferentially extending portion 18 extending from a tip portion of the radially extending portion 16 to both sides in the circumferential direction D3 and having a plate shape.

The plurality of turbine rotor blades 2 include a first turbine rotor blade 2A (2), a second turbine rotor blade 2B (2), and a third turbine rotor blade 2C (2).

The first turbine rotor blade 2A includes a first rotor blade 20 and a first shroud 24 provided on a tip portion 22 of the first rotor blade 20. The first rotor blade 20 is attached to an outer peripheral surface of the circumferentially extending portion 18 and extends to the outer side in the radial direction D2 from the outer peripheral surface of the circumferentially extending portion 18. The first shroud 24 has a plate shape and extends from the tip portion 22 of the first rotor blade 20 to both sides in the circumferential direction D3.

In the first embodiment, one side surface 24*a* of the first shroud 24 on one side in the circumferential direction D3 has an outer end e1 on an outer side in the radial direction D2 located on the one side in the circumferential direction D3 with respect to an inner end e2 on an inner side in the radial direction D2. The other side surface 24*b* of the first shroud 24 on the other side in the circumferential direction D3 has an outer end e3 on the outer side in the radial direction D2 located on the other side in the circumferential direction D3 with respect to an inner end e4 on the inner side in the radial direction D2. Each of the one side surface 24*a* and the other side surface 24*b* of the first shroud 24 faces the rotor disc 14 side (inner side) in the radial direction D2. The first shroud 24 has a symmetrical shape when viewed in the axial direction D1. The tip portion 22 of the first rotor blade 20 is located on a central portion of the first shroud 24 in the circumferential direction D3.

The second turbine rotor blade 2B includes a second rotor blade 40 and a second shroud 44 provided on a tip portion 42 of the second rotor blade 40. The second rotor blade 40 is disposed adjacent to the first rotor blade 20 on one side in the circumferential direction D3. In the circumferential direction D3, a space through which the combustion gas G3 flows is formed between the first rotor blade 20 and the second rotor blade 40. The second rotor blade 40 is attached to the outer peripheral surface of the circumferentially extending portion 18 and extends to the outer side in the radial direction D2 from the outer peripheral surface of the circumferentially extending portion 18. The second shroud 44 has a plate shape and extends from the tip portion 42 of the second rotor blade 40 to both sides in the circumferential direction D3.

In the first embodiment, one side surface 44*a* of the second shroud 44 on one side in the circumferential direction D3 has an outer end e5 on an outer side in the radial direction D2 located on the other side in the circumferential direction D3 with respect to an inner end e6 on an inner side in the radial direction D2. The other side surface 44*b* of the second shroud 44 on the other side in the circumferential direction D3 has an outer end e7 on the outer side in the radial direction D2 located on the one side in the circumferential direction D3 with respect to an inner end e8 on the inner side in the radial direction D2. Each of one side surface 44*a* and the other side surface 44*b* of the second shroud 44 faces a side (outer side) opposite to the rotor disc 14 side in the radial direction D2. The second shroud 44 has a symmetrical shape when viewed in the axial direction D1. The tip portion 42 of the second rotor blade 40 is located on a central portion of the second shroud 44 in the circumferential direction D3.

The third turbine rotor blade 2C includes a third rotor blade 60 and a third shroud 64 provided on a tip portion 62 of the third rotor blade 60. The third rotor blade 60 is disposed adjacent to the second rotor blade 40 on one side in the circumferential direction D3. In the circumferential direction D3, a space through which the combustion gas G3 flows is formed between the second rotor blade 40 and the third rotor blade 60. The third rotor blade 60 is attached to the outer peripheral surface of the circumferentially extending portion 18 and extends to the outer side in the radial direction D2 from the outer peripheral surface of the circumferentially extending portion 18. The third shroud 64 has a plate shape and extends from the tip portion 62 of the third rotor blade 60 to both sides in the circumferential direction D3.

In the first embodiment, one side surface 64*a* of the third shroud 64 on one side in the circumferential direction D3 has an outer end e9 on an outer side in the radial direction D2 located on the one side in the circumferential direction D3 with respect to an inner end e10 on an inner side in the radial direction D2. The other side surface 64*b* of the third shroud 64 on the other side in the circumferential direction D3 has an outer end e11 on the outer side in the radial direction D2 located on the other side in the circumferential direction D3 with respect to an inner end e12 on the inner side in the radial direction D2. Each of the one side surface 64*a* and the other side surface 64*b* of the third shroud 64 faces the rotor disc 14 side (inner side) in the radial direction D2. The third shroud 64 has a symmetrical shape when viewed in the axial direction D1. The tip portion 62 of the third rotor blade 60 is located in a central portion of the third shroud 64 in the circumferential direction D3.

In the first embodiment, the first rotor blade 20, the second rotor blade 40, and the third rotor blade 60 are configured to have the same shape as each other. Further, the first rotor blade 20, the second rotor blade 40, and the third rotor blade 60 are made of the same material.

Figure 3:
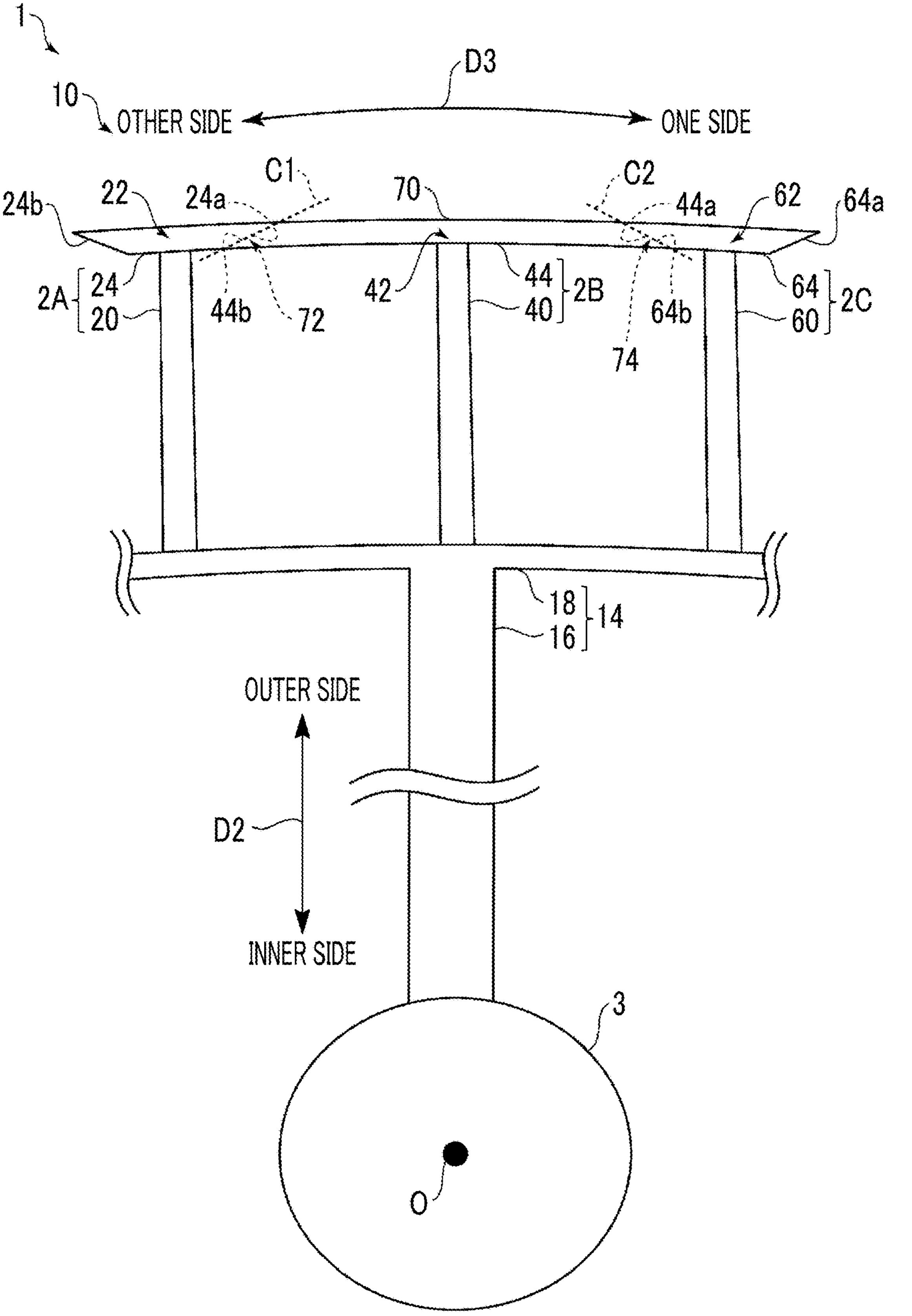
FIG. 3 is a diagram for describing an example of a method of forming the turbine according to the first embodiment.

An example of a method of forming each of the one side surface 24*a* of the first shroud 24, the other side surface 44*b* of the second shroud 44, the one side surface 44*a* of the second shroud 44, and the other side surface 64*b* of the third shroud 64 according to the first embodiment will be described. FIG. 3 is a diagram for describing an example of a method for forming the turbine 1 according to the first embodiment.

In the first embodiment, the turbine 1 employs a blisk structure in which the first turbine rotor blade 2A, the second turbine rotor blade 2B, the third turbine rotor blade 2C, and the rotor disc 14 are integrally configured by, for example, casting. In this case, as illustrated in FIG. 3, the first shroud 24, the second shroud 44, and the third shroud 64 are integrally configured as a single component (integrated shroud 70) as a whole.

Each of the one side surface 24*a* of the first shroud 24 and the other side surface 44*b* of the second shroud 44 is formed by a first cut surface 72 obtained by cutting the integrated shroud 70 along a first cutting line C1. As a result of the cutting, a gap may be formed between the one side surface 24*a* of the first shroud 24 and the other side surface 44*b* of the second shroud 44, or the one side surface 24*a* of the first shroud 24 and the other side surface 44*b* of the second shroud 44 may be in contact with each other.

The first cutting line C1 extends linearly and passes between a portion of the integrated shroud 70 (the central portion of the first shroud 24) to which the tip portion 22 of the first rotor blade 20 is connected and a portion of the integrated shroud 70 (the central portion of the second shroud 44) to which the tip portion 42 of the second rotor blade 40 is connected. The first cutting line C1 is closer to the central portion of the first shroud 24 than to the central portion the second of shroud 44 in the circumferential direction D3. That is, a length of the first shroud 24 in the circumferential direction D3 is shorter than a length of the second shroud 44 in the circumferential direction D3. Therefore, the second shroud 44 has a larger volume than the first shroud 24 and is heavier than the first shroud 24.

Each of the one side surface 44*a* of the second shroud 44 and the other side surface 64*b* of the third shroud 64 is formed by a second cut surface 74 obtained by cutting the integrated shroud 70 along a second cutting line C2. As a result of the cutting, a gap may be formed between the one side surface 44*a* of the second shroud 44 and the other side surface 64*b* of the third shroud 64, or the one side surface 44*a* of the second shroud 44 and the other side surface 64*b* of the third shroud 64 may be in contact with each other.

The second cutting line C2 extends linearly and passes between a portion of the integrated shroud 70 (the central portion of the second shroud 44) to which the tip portion 42 of the second rotor blade 40 is connected and a portion of the integrated shroud 70 (the central portion of the third shroud 64) to which the tip portion 62 of the third rotor blade 60 is connected. The second cutting line C2 is closer to the central portion of the third shroud 64 than to the central portion of the second shroud 44 in the circumferential direction D3. That is, a length of the third shroud 64 in the circumferential direction D3 is shorter than the length of the second shroud 44 in the circumferential direction D3. Therefore, the second shroud 44 has a larger volume than the third shroud 64 and is heavier than the third shroud 64.

In addition, the other side surface 24*b* of the first shroud 24 and the one side surface 64*a* of the third shroud 64 may be formed by cutting the integrated shroud 70. In this case, the integrated shroud 70 extends to the other side in the circumferential direction D3 from a forming portion of the other side surface 24*b* of the first shroud 24, and extends to the one side in the circumferential direction D3 from the one side surface 64*a* of the third shroud 64. In some embodiments, the other side surface 24*b* of the first shroud 24 and the other side surface 64*b* of the third shroud 64 may be formed simultaneously with creation (casting) of the integrated shroud 70.

Figure 4:
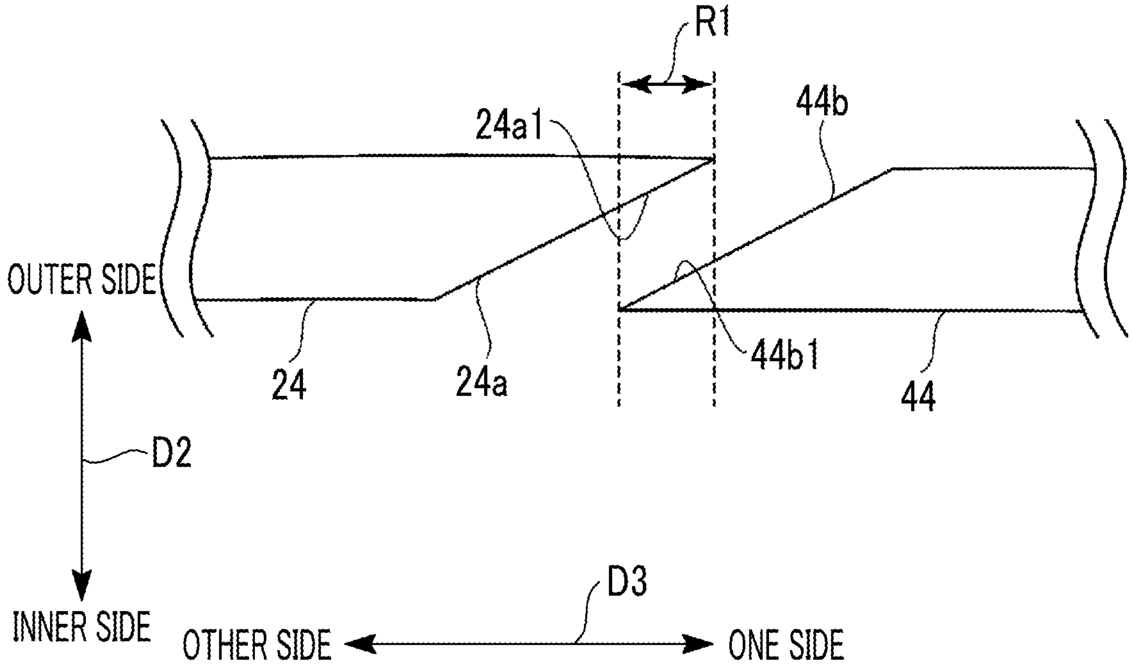
FIG. 4 is an enlarged view of a periphery of one side surface of a first shroud shown in FIG. 2.
Figure 5:
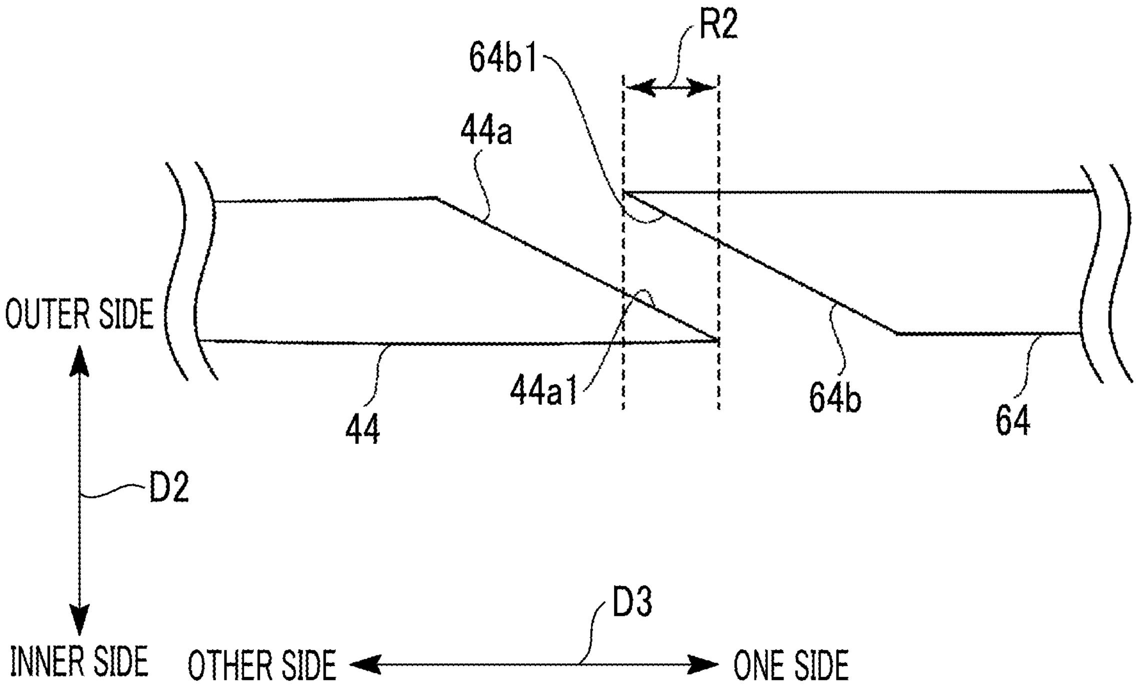
FIG. 5 is an enlarged view of a periphery of one side surface of a second shroud shown in FIG. 2.

FIG. 4 is an enlarged view of a periphery of the one side surface 24*a* of the first shroud 24 shown in FIG. 2. FIG. 5 is an enlarged view of a periphery of the one side surface 44*a* of the second shroud 44 shown in FIG. 2.

In the first embodiment, as illustrated in FIG. 4, each of the one side surface 24*a* of the first shroud 24 and the other side surface 44*b* of the second shroud 44 has a planar shape that is entirely a flat surface.

A region in which a part 24*a*1 of the one side surface 24*a* of the first shroud 24 and a part 44*b*1 of the other side surface 44*b* of the second shroud 44 overlap each other in the circumferential direction D3 is defined as a first overlap region R1. As illustrated in FIG. 4, in the first overlap region R1, the one side surface 24*a* of the first shroud 24 is located on the outer side in the radial direction D2 with respect to the other side surface 44*b* of the second shroud 44.

In the first embodiment, as illustrated in FIG. 5, each of the one side surface 44*a* of the second shroud 44 and the other side surface 64*b* of the third shroud 64 has a planar shape that is entirely a flat surface.

A region where a part 44*a*1 of the one side surface 44*a* of the second shroud 44 and a part 64*b*1 of the other side surface 64*b* of the third shroud 64 overlap each other in the circumferential direction D3 is defined as a second overlap region R2. As illustrated in FIG. 5, in the second overlap region R2, the one side surface 44*a* of the second shroud 44 is located on the outer side in the radial direction D2 with respect to the other side surface 64*b* of the third shroud 64.

Operations and Effects

The operations and effects of the turbine 1 according to the first embodiment will be described. According to the first embodiment, the second shroud 44 is heavier than the first shroud 24. Therefore, during the operation of the turbine 1, a centrifugal force acting on the second rotor blade 40 is larger than a centrifugal force acting on the first rotor blade 20. For this reason, the second rotor blade 40 extends longer along the radial direction D2 than the first rotor blade 20. In the first overlap region R1, since the one side surface 24*a* of the first shroud 24 is located on the outer side in the radial direction D2 with respect to the other side surface 44*b* of the second shroud 44, the part 44*b*1 of the other side surface of the second shroud 44 is in a state of being in contact with or being pressed against the part 24*a*1 of the one side surface 24*a* of the first shroud 24. Therefore, when one or both of the first turbine rotor blade 2A and the second turbine rotor blade 2B vibrate, the part 44*b*1 of the other side surface 44*b* of the second shroud 44 can be slid on the part 24*a*1 of the one side surface 24*a* of the first shroud 24, and thus a high damping effect due to friction can be obtained.

According to the first embodiment, the first shroud 24 and the second shroud 44 have different shapes from each other. Therefore, a static deformation property of the first turbine rotor blade 2A and a static deformation property of the second turbine rotor blade 2B during the operation of the turbine 1 are different from each other. For this reason, natural frequencies of the first turbine rotor blade 2A and the second turbine rotor blade 2B become nonuniform with each other, and a so-called mistuning structure can be adopted for the turbine 1, so that the vibration of the turbine 1 can be suppressed.

According to the first embodiment, the second shroud 44 is heavier than the third shroud 64. Therefore, during the operation of the turbine 1, the centrifugal force acting on the second rotor blade 40 is larger than a centrifugal force acting on the third rotor blade 60. For this reason, the second rotor blade 40 extends longer along the radial direction D2 than the third rotor blade 60. Then, in the second overlap region R2, since the other side surface 64*b* of the third shroud 64 is located on the outer side in the radial direction D2 with respect to the one side surface 44*a* of the second shroud 44, the part 44*a*1 of the one side surface 44*a* of the second shroud 44 is in a state of being in contact with or being pressed against the part 64*b*1 of the other side surface 64*b* of the third shroud 64. Therefore, when one or both of the second turbine rotor blade 2B and the third turbine rotor blade 2C vibrate, the part 44*a*1 of the one side surface 44*a* of the second shroud 44 can be slid on the part 64*b*1 of the other side surface 64*b* of the third shroud 64, and thus a high damping effect due to friction can be obtained.

According to the first embodiment, by simply cutting the integrated shroud 70 along the first cutting line C1, it is possible to simultaneously form the one side surface 24*a* of the first shroud 24 and the other side surface 44*b* of the second shroud 44. Similarly, by simply cutting the integrated shroud 70 along the second cutting line C2, it is possible to simultaneously form the one side surface 44*a* of the second shroud 44 and the other side surface 64*b* of the third shroud 64. For this reason, compared to a case where it is necessary to create a separate component (pin) as described in PTL 1, the effort required to process the turbine 1 can be reduced. Further, since a sliding area can be increased as compared to PTL 1 in which the pin is slid on the pin engaging hole, a damping effect higher than that of PTL 1 can be obtained.

In the first embodiment, a case where the plurality of turbine rotor blades 2 are three has been described as an example. However, the present disclosure is not limited to this form. The turbine 1 may include two turbine rotor blades 2 or four or more turbine rotor blades 2.

In the first embodiment, a case where the first turbine rotor blade 2A, the second turbine rotor blade 2B, and the third turbine rotor blade 2C are mounted on the common rotor disc 14 has been described as an example. However, the present disclosure is not limited to this form. The rotor disc 14 to which the first turbine rotor blade 2A is mounted and the rotor disc 14 to which the second turbine rotor blade 2B is mounted may be separate members. The rotor disc 14 to which the second turbine rotor blade 2B is mounted and the rotor disc 14 to which the third turbine rotor blade 2C is mounted may be separate members.

In the first embodiment, a case where the turbine 1 employs a blisk structure in which the turbine rotor blade 2 and the rotor disc 14 are integrally configured has been described as an example. However, the present disclosure is not limited to this form. The turbine rotor blade 2 and the rotor disc 14 may be separately configured.

In the first embodiment, each of the first shroud 24, the second shroud 44, and the third shroud has a symmetrical shape when viewed in the axial direction D1. However, the present disclosure is not limited to this form. Any one of the first shroud 24, the second shroud 44, and the third shroud may have an asymmetric shape when viewed in the axial direction D1.

In the first embodiment, the part 24*a*1 of the one side surface 24*a* of the first shroud and the part 44*b*1 of the other side surface 44*b* of the second shroud overlap each other in the first overlap region R1. However, the present disclosure is not limited to this form. In some embodiments, the entirety of the one side surface 24*a* of the first shroud and the entirety of the other side surface 44*b* of the second shroud overlap each other in the first overlap region R1. In some embodiments, the part 24*a*1 of the one side surface 24*a* of the first shroud and the entirety of the other side surface 44*b* of the second shroud overlap each other in the first overlap region R1.

Second Embodiment

A turbine 1 according to a second embodiment of the present disclosure will be described. In the turbine 1 according to the second embodiment, a shape of the one side surface 24*a* of the first shroud 24 is different from that of the turbine 1 according to the first embodiment. In the second embodiment, the same components as those in the first embodiment are designated by the same reference signs, and the detailed descriptions thereof will not be repeated.

(Configuration)

Figure 6:
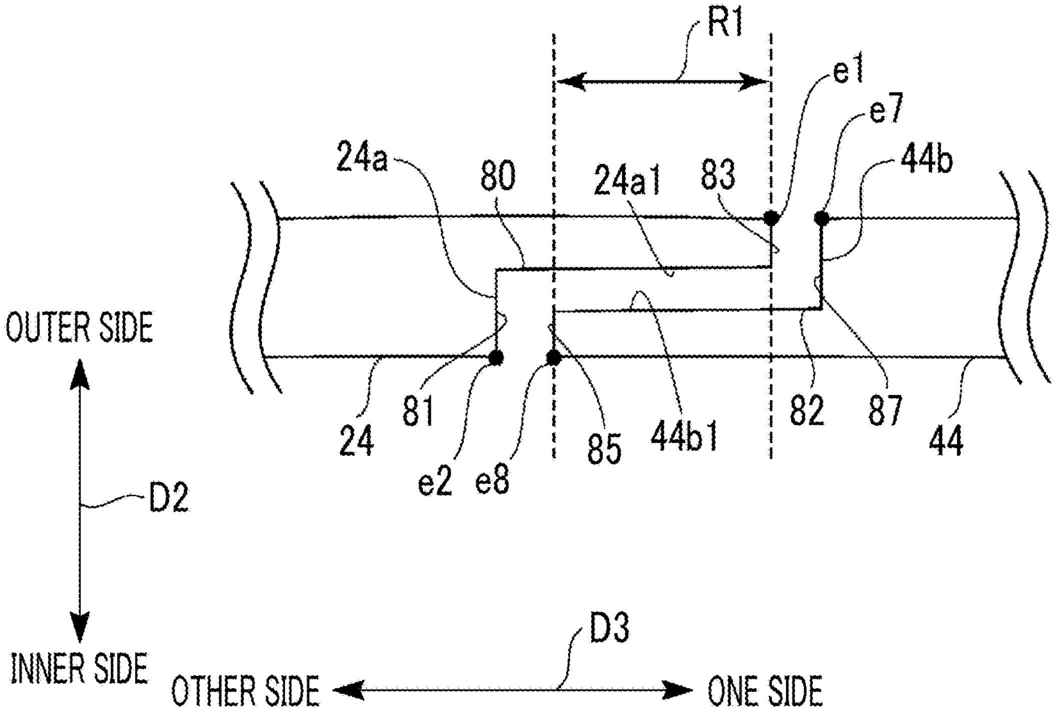
FIG. 6 is an enlarged view of a periphery of one side surface of a first shroud according to a second embodiment.

FIG. 6 is an enlarged view of the periphery of the one side surface 24*a* of the first shroud 24 according to the second embodiment. In the second embodiment, as illustrated in FIG. 6, the one side surface 24*a* of the first shroud 24 includes an inward stepped surface 80 facing the inner side in the radial direction D2. The other side surface 44*b* of the second shroud 44 includes an outward stepped surface 82 facing the outer side in the radial direction D2.

In the second embodiment, the one side surface 24*a* of the first shroud 24 includes the inward stepped surface 80, a first inner surface 81, and a first outer surface 83. The first inner surface 81 extends from the inner end e2 of the one side surface 24*a* of the first shroud 24 toward the outer side in the radial direction D2. The first outer surface 83 extends from the outer end e1 of the one side surface 24*a* of the first shroud 24 toward the inner side in the radial direction D2. The inward stepped surface 80 extends along the circumferential direction D3 and connects the first inner surface 81 and the first outer surface 83.

The other side surface 44*b* of the second shroud 44 includes the outward stepped surface 82, a second inner surface 85, and a second outer surface 87. The second inner surface 85 extends from the inner end e8 of the other side surface 44*b* of the second shroud 44 toward the outer side in the radial direction D2. The second outer surface 87 extends from the outer end e7 of the other side surface 44*b* of the second shroud 44 toward the inner side in the radial direction D2. The outward stepped surface 82 extends along the circumferential direction D3 and connects the second inner surface 85 and the second outer surface 87.

Each of the inward stepped surface 80 and the outward stepped surface 82 has a planar shape that is entirely a flat surface. The inward stepped surface 80 and the outward stepped surface 82 extend parallel to each other along the axial direction D1. The inward stepped surface 80 includes the part 24*a*1 of the one side surface 24*a* included in the first overlap region R1. The outward stepped surface 82 includes the part 44*b*1 of the other side surface 44*b* included in the first overlap region R1.

Operations and Effects

The operations and effects of the turbine 1 according to the second embodiment will be described. According to the second embodiment, compared to the first embodiment, it is easy to control an area in which the other side surface 44*b* of the second shroud 44 comes into contact with or pressed against the one side surface 24*a* of the first shroud 24 during the operation of the turbine 1. Therefore, the vibration of the turbine 1 can be suppressed as intended.

In the second embodiment, a case where the one side surface 24*a* of the first shroud 24 has a stepped shape has been described. However, the one side surface 44*a* of the second shroud 44 may have a stepped shape.

Third Embodiment

A turbine 1 according to a third embodiment of the present disclosure will be described. The turbine 1 according to the third embodiment further limits a configuration of the turbine 1 according to the first embodiment. In the third embodiment, the same components as those in the first embodiment are designated by the same reference signs, and the detailed descriptions thereof will not be repeated.

(Configuration)

Figure 7:
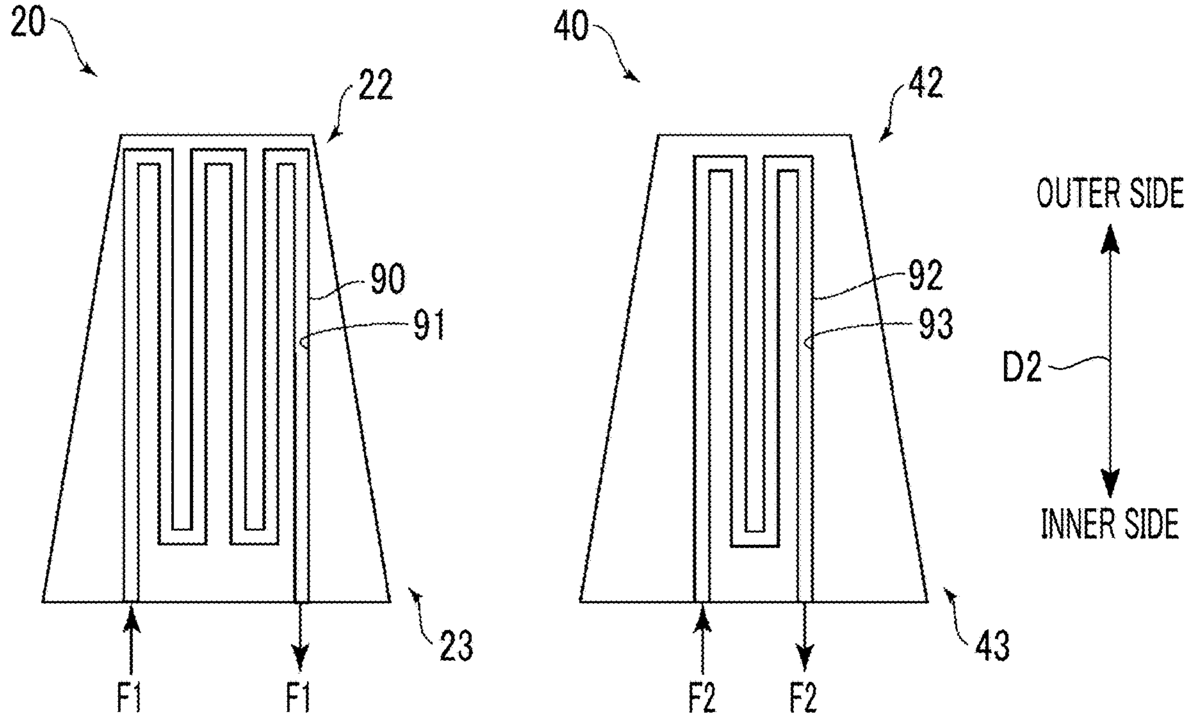
FIG. 7 is a diagram schematically showing an internal configuration of a first rotor blade and an internal configuration of a second rotor blade according to a third embodiment.

FIG. 7 is a diagram schematically showing an internal configuration of the first rotor blade 20 and an internal configuration of the second rotor blade 40 according to the third embodiment.

In the third embodiment, as illustrated in FIG. 7, a first cooling flow path 90 through which a first refrigerant F1 for cooling the first rotor blade 20 flows is formed inside the first rotor blade 20. An inlet and an outlet of the first cooling flow path 90 are formed in a blade root portion 23 of the first rotor blade 20 on a side opposite to the tip portion 22 of the first rotor blade 20 in the radial direction D2. A second cooling flow path 92 through which a second refrigerant F2 for cooling the second rotor blade 40 flows is formed inside the second rotor blade 40. An inlet and an outlet of the second cooling flow path 92 are formed in a blade root portion 43 of the second rotor blade 40 on a side opposite to the tip portion 42 of the second rotor blade 40 in the radial direction D2. The second refrigerant F2 is the same refrigerant as the first refrigerant F1.

A first cooling surface 91 defining the first cooling flow path 90 has a larger area than a second cooling surface 93 defining the second cooling flow path 92. In the third embodiment, the first cooling flow path 90 is longer than the second cooling flow path 92. In some embodiments, the first cooling flow path 90 has a larger flow path cross section than the second cooling flow path 92.

Operations and Effects

The operations and effects of the turbine 1 according to the third embodiment will be described. According to the third embodiment, since the first cooling surface 91 has a larger area than the second cooling surface 93, thermal expansion acting on the second rotor blade 40 is larger than thermal expansion acting on the first rotor blade 20. That is, the second rotor blade 40 extends longer along the radial direction D2 than the first rotor blade 20 due to thermal expansion. For this reason, by utilizing not only a difference in magnitude of the centrifugal force acting on the second rotor blade 40 and the centrifugal force acting on the first rotor blade 20 but also a difference in magnitude of the thermal expansion acting on the second rotor blade 40 and the thermal expansion acting on the first rotor blade 20, the part 44*b*1 of the other side surface 44*b* of the second shroud 44 is slid on the part 24*a*1 of the one side surface 24*a* of the first shroud 24 during the operation of the turbine 1. Therefore, a higher damping effect due to friction can be obtained.

The configurations of the first rotor blade 20 and the second rotor blade 40 according to the third embodiment described with reference to FIG. 7 may be applied to the turbine 1 according to the second embodiment.

Fourth Embodiment (Configuration)

Figure 8:
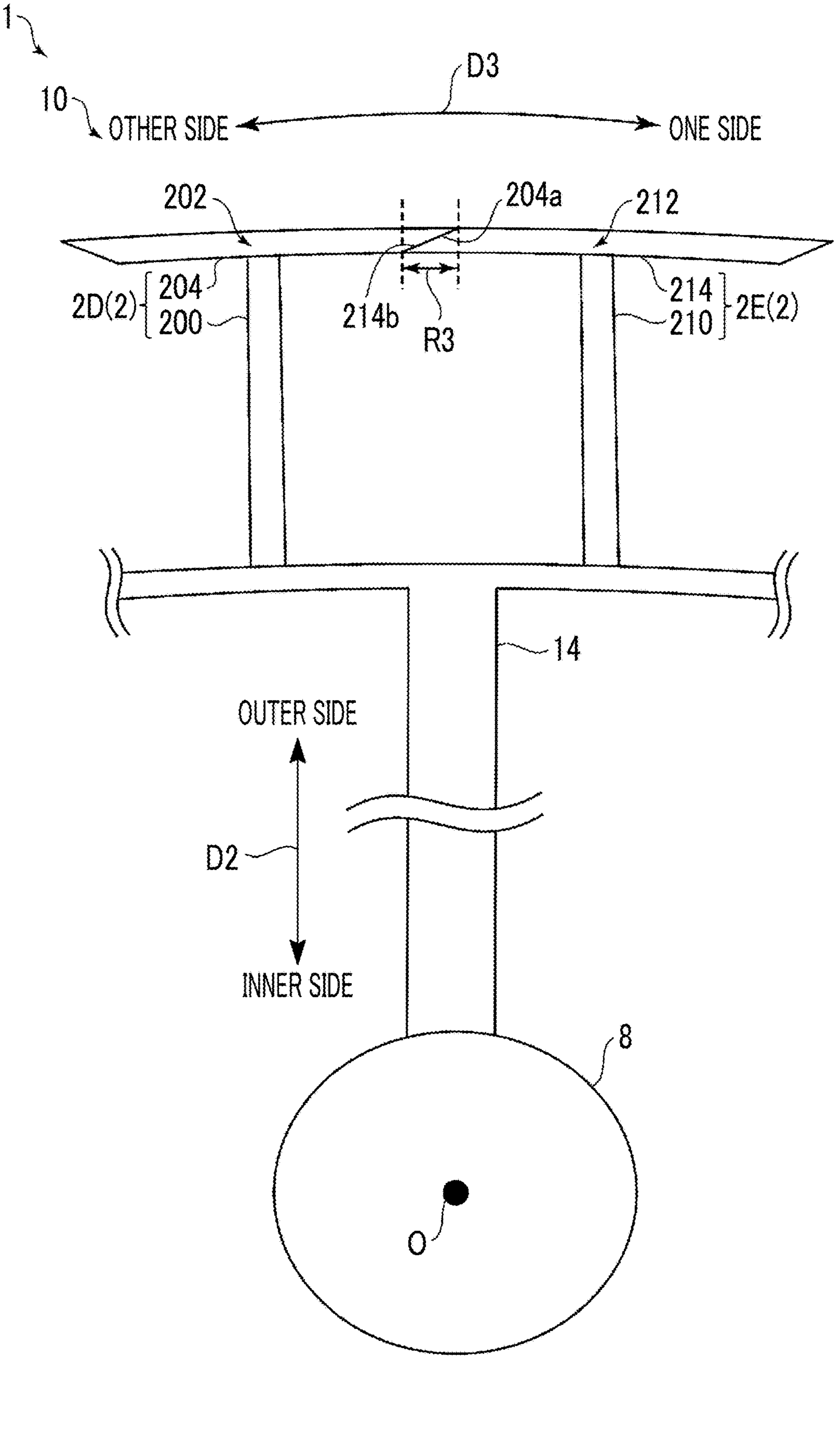
FIG. 8 is a diagram schematically showing a configuration of a turbine according to a fourth embodiment.

A turbine 1 according to a fourth embodiment of the present disclosure will be described. FIG. 8 is a diagram schematically showing a configuration of the turbine 1 according to the fourth embodiment. FIG. 8 shows two turbine rotor blades 2 included in the turbine rotor blade row 10 of FIG. 1.

In the fourth embodiment, as illustrated in FIG. 8, the turbine 1 includes the rotor disc 14 fixed to the turbine rotor 3. The rotor disc 14 is fixed to the turbine rotor 3, for example, by being fitted into a hole formed in the outer peripheral surface of the turbine rotor 3. In some embodiments, the rotor disc 14 is fixed to the turbine rotor 3 by a fastener such as a bolt.

The plurality of turbine rotor blades 2 include a fourth turbine rotor blade 2D (2) and a fifth turbine rotor blade 2E (2).

The fourth turbine rotor blade 2D includes a fourth rotor blade 200 and a fourth shroud 204 provided on a tip portion 202 of the fourth rotor blade 200. The fourth rotor blade 200 extends from the rotor disc 14 to the outer side in the radial direction D2. The fourth shroud 204 has a plate shape and extends from the tip portion 202 of the fourth rotor blade 200 to both sides in the circumferential direction D3.

The fifth turbine rotor blade 2E includes a fifth rotor blade 210 and a fifth shroud 214 provided on a tip portion 212 of the fifth rotor blade 210. The fifth rotor blade 210 is disposed adjacent to the fourth rotor blade 200 on one side in the circumferential direction D3. The fifth rotor blade 210 extends from the rotor disc 14 to the outer side in the radial direction D2. In the circumferential direction D3, a space through which the combustion gas G3 flows is formed between the fourth rotor blade 200 and the fifth rotor blade 210. The fifth shroud 214 has a plate shape and extends from the tip portion 212 of the fifth rotor blade 210 to both sides in the circumferential direction D3.

In the fourth embodiment, the fourth rotor blade 200 and the fifth rotor blade 210 are configured to have the same shape as each other. Further, the fourth rotor blade 200 and the fifth rotor blade 210 are made of the same material.

In the fourth embodiment, the turbine 1 adopts a configuration in which the fourth turbine rotor blade 2D, the fifth turbine rotor blade 2E, and the rotor disc 14 are separate members. The rotor disc 14 is configured such that the fourth turbine rotor blade 2D and the fifth turbine rotor blade 2E are attached thereto by a mechanical connection method such as fitting.

A region in which one side surface 204*a* of the fourth shroud 204 and the other side surface 214*b* of the fifth shroud 214 overlap each other in the circumferential direction D3 is defined as a third overlap region R3. As illustrated in FIG. 8, in the third overlap region R3, the one side surface 204*a* of the fourth shroud 204 is located on the outer side in the radial direction D2 with respect to the other side surface 214*b* of the fifth shroud 214.

Figure 9:
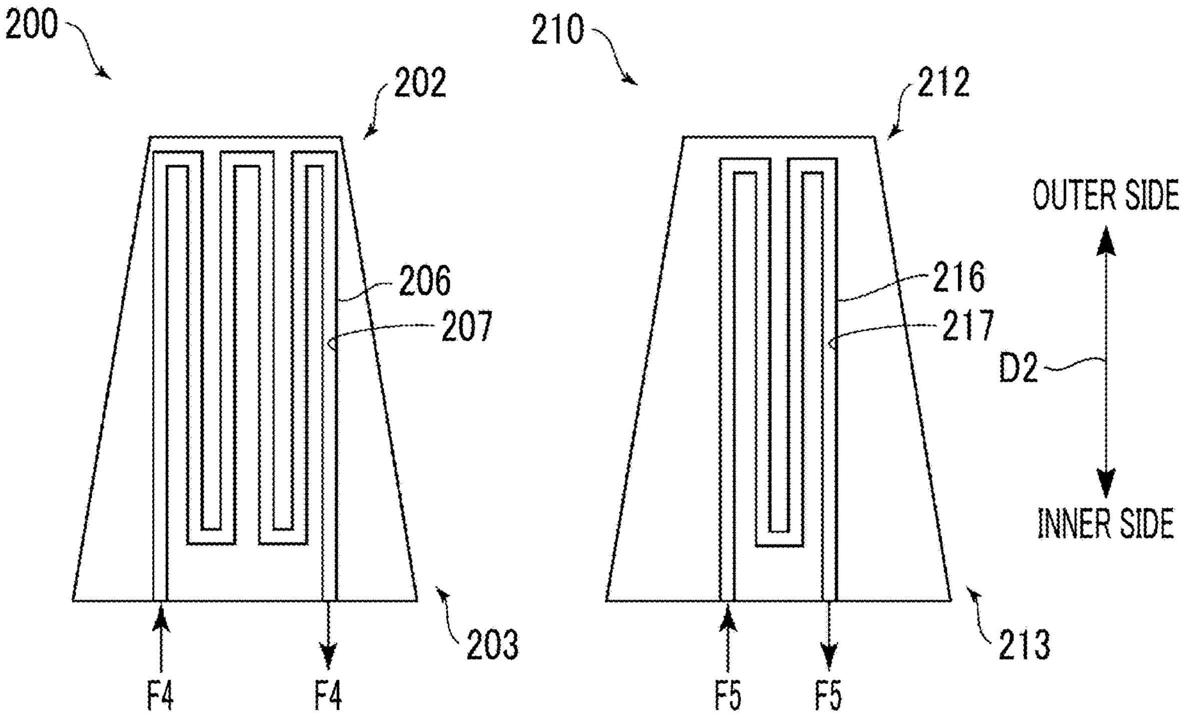
FIG. 9 is a diagram schematically showing an internal configuration of a fourth rotor blade and an internal configuration of a fifth rotor blade according to the fourth embodiment.

FIG. 9 is a diagram schematically showing an internal configuration of the fourth rotor blade 200 and an internal configuration of the fifth rotor blade 210 according to the fourth embodiment.

In the fourth embodiment, as illustrated in FIG. 9, a fourth cooling flow path 206 through which a fourth refrigerant F4 for cooling the fourth rotor blade 200 flows is formed inside the fourth rotor blade 200. An inlet and an outlet of the fourth cooling flow path 206 are formed in a blade root portion 203 of the fourth rotor blade 200 on a side opposite to the tip portion 202 of the fourth rotor blade 200 in the radial direction D2. A fifth cooling flow path 216 through which a fifth refrigerant F5 for cooling the fifth rotor blade 210 flows is formed inside the fifth rotor blade 210. An inlet and an outlet of the fifth cooling flow path 216 are formed in a blade root portion 213 of the fifth rotor blade 210 on a side opposite to the tip portion 212 of the fifth rotor blade 210 in the radial direction D2. The fifth refrigerant F5 is the same refrigerant as the fourth refrigerant F4.

A fourth cooling surface 207 defining the fourth cooling flow path 206 has a larger area than a fifth cooling surface 217 defining the fifth cooling flow path 216. In the fourth embodiment, the fourth cooling flow path 206 is longer than the fifth cooling flow path 216. In some embodiments, the fourth cooling flow path 206 has a larger flow path cross section than the fifth cooling flow path 216.

Operations and Effects

The operations and effects of the turbine 1 according to the fourth embodiment will be described. According to the fourth embodiment, since the fourth cooling surface 207 has a larger area than the fifth cooling surface 217, an elongation of the fifth rotor blade 210 due to thermal expansion acting on the fifth rotor blade 210 is larger than an elongation of the fourth rotor blade 200 due to thermal expansion acting on the fourth rotor blade 200 during the operation of the turbine 1. In the third overlap region R3, since the one side surface 204*a* of the fourth shroud 204 is located on the outer side in the radial direction D2 with respect to the other side surface 214*b* of the fifth shroud 214, the other side surface 214*b* of the fifth shroud 214 is in a state of being in contact with or being pressed against the one side surface 204*a* of the fourth shroud 204. Therefore, when one or both of the fourth turbine rotor blade 2D and the fifth turbine rotor blade 2E vibrate, the other side surface 214*b* of the fifth shroud 214 can be slid on the one side surface 204*a* of the fourth shroud 204, and thus a high damping effect due to friction can be obtained.

The contents described in each embodiment are understood as follows, for example.

[1] The turbine (1) according to the present disclosure includes the rotor (3); and the plurality of turbine blades (2) disposed along the circumferential direction (D3) of the rotor, in which the plurality of turbine blades include the first turbine blade (2A) including the first rotor blade (20) and the first shroud (24) provided on the tip portion (22) of the first rotor blade, and the second turbine blade (2B) including the second rotor blade (40) disposed adjacent to the first rotor blade on one side in the circumferential direction of the rotor and the second shroud (44) provided on the tip portion (42) of the second rotor blade, in the overlap region (R1) in which at least the part (24*a*1) of the one side surface (24*a*) of the first shroud on the one side in the circumferential direction and at least the part (44*b*1) of the other side surface (44*b*) of the second shroud on the other side in the circumferential direction overlap each other in the circumferential direction, the one side surface is located on an outer side in the radial direction (D2) with respect to the other side surface, and the second shroud is heavier than the first shroud.

According to the configuration of [1] above, the second shroud is heavier than the first shroud. Therefore, during the operation of the turbine, the centrifugal force acting on the second rotor blade is larger than the centrifugal force acting on the first rotor blade. For this reason, the second rotor blade extends longer along the radial direction than the first rotor blade. In the overlap region, since the one side surface of the first shroud is located on the outer side in the radial direction with respect to the other side surface of the second shroud, at least the part of the other side surface of the second shroud is in a state of being in contact with or being pressed against at least the part of the one side surface of the first shroud. Therefore, when one or both of the first turbine blade and the second turbine blade vibrate, at least the part of the other side surface of the second shroud can be slid on at least the part of the one side surface of the first shroud, and thus a high damping effect due to friction can be obtained.

[2] In some embodiments, in the configuration according to [1] above, the length of the first shroud in the circumferential direction is shorter than the length of the second shroud in the circumferential direction.

According to the configuration of [2] above, the first shroud and the second shroud have different shapes from each other. Therefore, the static deformation property of the first turbine blade and the static deformation property of the second turbine blade during the operation of the turbine are different from each other. For this reason, the natural frequencies of the first turbine blade and the second turbine blade become nonuniform with each other, and a so-called mistuning structure can be adopted for the turbine, so that the vibration of the turbine can be suppressed.

[3] In some embodiments, in the configuration according to [1] or [2] above, each of the one side surface and the other side surface is the cut surface (72) obtained by cutting the integrated shroud (70) in which the first shroud and the second shroud are integrally configured.

According to the configuration of [3] above, it is possible to simultaneously form the one side surface and the other side surface by simply cutting the integrated shroud. Therefore, compared to a case where it is necessary to create a separate component (pin) as described in PTL 1, the effort required to process the turbine can be reduced.

[4] In some embodiments, in the configuration according to any one of [1] to [3] above, each of the one side surface and the other side surface has a planar shape that is entirely a flat surface.

According to the configuration of [4] above, the overlap region can be formed by a simple configuration, and the one side surface can be located on the outer side in the radial direction with respect to the other side surface.

[5] some embodiments, in the configuration according to any one of [1] to [3] above, the one side surface includes the inward stepped surface (80) facing the inner side in the radial direction, and the other side surface includes the outward stepped surface (82) that faces the outer side in the radial direction.

According to the configuration of [5] above, compared to the configuration of [4] above, it is easy to control the area in which the other side surface comes into contact with or is pressed against the one side surface during the operation of the turbine.

[6] some embodiments, in the configuration according to any one of [1] to [5] above, the plurality of turbine blades further include the third turbine blade (2C) including the third rotor blade (60) disposed adjacent to the second rotor blade on the one side in the circumferential direction of the rotor and the third shroud (64) provided at the tip portion (62) of the third rotor blade, in the second overlap region (R2) in which at least the part (44*a*1) of the one side surface (44*a*) of the second shroud on the one side in the circumferential direction and at least the part (64*b*1) of the other side surface (64*b*) of the third shroud on the other side in the circumferential direction overlap each other in the circumferential direction, the other side surface of the third shroud on the other side in the circumferential direction is located on the outer side in the radial direction with respect to the one side surface of the second shroud on the one side in the circumferential direction, and the second shroud is heavier than the third shroud.

According to the configuration of [6] above, the second shroud is heavier than the third shroud. Therefore, during the operation of the turbine, the centrifugal force acting on the second rotor blade is larger than the centrifugal force acting on the third rotor blade. For this reason, the second rotor blade extends longer along the radial direction than the third rotor blade. In the second overlap region, since the other side surface of the third shroud is located on the outer side in the radial direction with respect to the one side surface of the second shroud, at least the part of the one side surface of the second shroud is in a state of being in contact with or being pressed against at least the part of the other side surface of the third shroud. Therefore, when one or both of the second turbine blade and the third turbine blade vibrate, at least the part of the one side surface of the second shroud can be slid on at least the part of the other side surface of the third shroud, and thus a high damping effect due to friction can be obtained.

[7] In some embodiments, in the configuration according to any one of [1] to [6] above, the first cooling flow path (90) through which the refrigerant (F1) for cooling the first rotor blade flows is formed inside the first rotor blade, the second cooling flow path (92) through which the refrigerant (F2) for cooling the second rotor blade flows is formed inside the second rotor blade, and the first cooling surface (91) defining the first cooling flow path has a larger area than the second cooling surface (93) defining the second cooling flow path.

According to the configuration of [7] above, by utilizing not only the difference in magnitude of the centrifugal force acting on the second rotor blade and the centrifugal force acting on the first rotor blade but also the difference in magnitude of the thermal expansion acting on the second rotor blade and the thermal expansion acting on the first rotor blade, at least the part of the other side surface of the second shroud is slid on at least the part of the one side surface of the first shroud during the operation of the turbine. Therefore, a higher damping effect due to friction can be obtained.

[8] The turbine according to the present disclosure includes the rotor (3); and the plurality of turbine blades (2) disposed along the circumferential direction (D3) of the rotor, in which the plurality of turbine blades include the first turbine blade (2D) including the first rotor blade (200) and the first shroud (204) provided on the tip portion (202) of the first rotor blade, and the second turbine blade (2E) including the second rotor blade (210) disposed adjacent to the first rotor blade on one side in the circumferential direction of the rotor and the second shroud (214) provided on the tip portion (212) of the second rotor blade, in the overlap region (R3) in which at least the part of the one side surface (204*a*) of the first shroud on the one side in the circumferential direction and at least the part of the other side surface (214*b*) of the second shroud on the other side in the circumferential direction overlap each other in the circumferential direction, the one side surface is located on an outer side in the radial direction (D2) with respect to the other side surface, the first cooling flow path (206) through which the refrigerant (F4) for cooling the first rotor blade flows is formed inside the first rotor blade, the second cooling flow path (216) through which the refrigerant (F5) for cooling the second rotor blade flows is formed inside the second rotor blade, and the first cooling surface (207) defining the first cooling flow path has a larger area than the second cooling surface (217) defining the second cooling flow path.

According to the configuration of [8] above, since the first cooling surface has a larger area than the second cooling surface, the elongation of the second rotor blade due to the thermal expansion acting on the second rotor blade is larger than the elongation of the first rotor blade due to the thermal expansion acting on the first rotor blade during the operation of the turbine. In the overlap region, since the one side surface of the first shroud is located on the outer side in the radial direction with respect to the other side surface of the second shroud, at least the part of the other side surface of the second shroud is in a state of being in contact with or being pressed against at least the part of the one side surface of the first shroud. Therefore, when one or both of the first turbine blade and the second turbine blade vibrate, at least the part of the other side surface of the second shroud can be slid on at least the part of the one side surface of the first shroud, and thus a high damping effect due to friction can be obtained.

REFERENCE SIGNS LIST

1: Turbine
2: turbine rotor blade
2A: first turbine rotor blade
2B: second turbine rotor blade
2C: third turbine rotor blade
2D: fourth turbine rotor blade
2E: fifth turbine rotor blade
3: turbine rotor
14: rotor disc
20: first rotor blade
22: tip portion of first rotor blade
24: first shroud
24*a*: one side surface of first shroud
24*a*1: part of one side surface of first shroud
40: second rotor blade
42: tip portion of second rotor blade
44: second shroud
44*a*: one side surface of second shroud
44*a*1 part of one side surface of second shroud
44*b*: other side surface of second shroud
44*b*1: part of other side surface of second shroud
60: third rotor blade
62: tip portion of third rotor blade
64: third shroud
64*b*: other side surface of third shroud
64*b*1: part of other side surface of third shroud
70: integrated shroud
72: first cut surface
74: second cut surface
80: inward stepped surface
82: outward stepped surface
90: first cooling flow path
91: first cooling surface
92: second cooling flow path
93: second cooling surface
200: fourth rotor blade
202: tip portion of fourth rotor blade
204: fourth shroud
204*a*: one side surface of fourth shroud
206: fourth cooling flow path
207: fourth cooling surface
210: fifth rotor blade
212: tip portion of fifth rotor blade
214: fifth shroud
214*b*: other side surface of fifth shroud
216: fifth cooling flow path
217: fifth cooling surface
C1: first cutting line
C2: second cutting line
D1: axial direction
D2: radial direction
D3: circumferential direction
F1: first refrigerant
F2: second refrigerant
F4: fourth refrigerant
F5: fifth refrigerant
O: axis
R1: first overlap region
R2: second overlap region
R3: third overlap region

The invention claimed is:

1. A turbine comprising:
a rotor; and
a plurality of turbine blades attached to the rotor so that the plurality of turbine blades are disposed along a circumferential direction of the rotor,
wherein the plurality of turbine blades include a first turbine blade including a first rotor blade and a first shroud provided on a tip portion of the first rotor blade, and a second turbine blade including a second rotor blade disposed adjacent to the first rotor blade on one side in the circumferential direction of the rotor and a second shroud provided on a tip portion of the second rotor blade,
in an overlap region in which at least a part of one side surface of the first shroud on the one side in the circumferential direction and at least a part of an other side surface of the second shroud on the other side in the circumferential direction overlap each other in the circumferential direction, the one side surface is located on an outer side in a radial direction with respect to the other side surface,
the second shroud is heavier than the first shroud,
a first cooling flow path through which a refrigerant for cooling the first rotor blade flow is formed inside the first rotor blade,
a second cooling flow path through which a refrigerant for cooling the second rotor blade is formed inside the second rotor blade, and
a first cooling surface defining the first cooling flow path has a larger area than a second cooling surface defining the second cooling flow path.

2. The turbine according to claim 1, wherein a length of the first shroud in the circumferential direction is shorter than a length of the second shroud in the circumferential direction.

3. The turbine according to claim 1, wherein each of the one side surface and the other side surface is a cut surface obtained by cutting an integrated shroud that is manufactured as a single part in which the first shroud and the second shroud are integrally configured.

4. The turbine according to claim 1, wherein each of the one side surface and the other side surface has a planar shape that is entirely a flat surface.

5. The turbine according to claim 1, wherein the one side surface includes an inward stepped surface that faces an inner side in the radial direction, and the other side surface includes an outward stepped surface that faces the outer side in the radial direction.

6. The turbine according to claim 1, wherein the plurality of turbine blades further include a third turbine blade including a third rotor blade disposed adjacent to the second rotor blade on the one side in the circumferential direction of the rotor and a third shroud provided on a tip portion of the third rotor blade, in a second overlap region in which at least a part of one side surface of the second shroud on the one side in the circumferential direction and at least a part of an other side surface of the third shroud on the other side in the circumferential direction overlap each other in the circumferential direction, the other side surface of the third shroud on the other side in the circumferential direction is located on the outer side in the radial direction with respect to the one side surface of the second shroud on the one side in the circumferential direction, and the second shroud is heavier than the third shroud.

7. The turbine according to claim 1, further comprising:

a circumferentially extending portion connected to the rotor, wherein each of the plurality of turbine blades is connected to the circumferentially extending portion, and the circumferentially extending portion is between each of the plurality of turbine blades and the rotor.

8. The turbine according to claim 1, wherein a dimension of the second shroud in the radial direction is greater than a dimension of the first shroud in the radial direction.

* * * * *